(12) United States Patent
Molinari et al.

(10) Patent No.: US 10,654,719 B2
(45) Date of Patent: May 19, 2020

(54) ZERO EMISSIONS SULPHUR RECOVERY PROCESS WITH CONCURRENT HYDROGEN PRODUCTION

(71) Applicant: STAMICARBON B.V. ACTING UNDER THE NAME OF MT INNOVATION CENTER, Sittard (NL)

(72) Inventors: Lucio Molinari, Milan (IT); Fabio Angelini, Rome (IT); Lucia Barbato, Rome (IT)

(73) Assignee: STAMICARBON B.V. ACTING UNDER THE NAME OF MT INNOVATION CENTER, Sittard (NL)

( * ) Notice: Subject to any disclaimer, the term of this patent is extended or adjusted under 35 U.S.C. 154(b) by 0 days.

(21) Appl. No.: 14/757,761

(22) Filed: Dec. 23, 2015

(65) Prior Publication Data
US 2016/0122184 A1    May 5, 2016

Related U.S. Application Data

(63) Continuation of application No. 14/115,812, filed as application No. PCT/NL2012/050310 on May 7, 2012, now Pat. No. 9,242,859.

(30) Foreign Application Priority Data

May 6, 2011    (EP) .................................... 11165177

(51) Int. Cl.
*C01B 17/04*    (2006.01)
*C01B 3/02*    (2006.01)
(Continued)

(52) U.S. Cl.
CPC .......... *C01B 3/065* (2013.01); *B01D 53/8612* (2013.01); *B01J 19/24* (2013.01);
(Continued)

(58) Field of Classification Search
CPC ....... C01B 3/04; C01B 17/0495; C01B 3/065; C01B 3/02; C01B 17/0413;
(Continued)

(56) References Cited

U.S. PATENT DOCUMENTS 3,408,417 A * 10/1968 Sogawa .................... C07C 4/04
585/541
4,302,434 A * 11/1981 Hellmer .................... C01B 3/04
423/571
(Continued)

FOREIGN PATENT DOCUMENTS

IT    1203898    2/1989
JP    1-270502    10/1989
(Continued)

OTHER PUBLICATIONS

Clark et al., "Production of H2 from catalytic partial oxidation of H2S in a short-contact-time reactor", Catalysis Communications (2004) 5(12):743-747.
(Continued)

*Primary Examiner* — Amber R Orlando
*Assistant Examiner* — Syed T Iqbal
(74) *Attorney, Agent, or Firm* — Morrison & Foerster LLP

(57) ABSTRACT

Disclosed is a process for the concurrent production of hydrogen and sulphur from a $H_2S$-containing gas stream, with zero emissions. The method comprises the thermal oxidative cracking of $H_2S$ so as to form $H_2$ and $S_2$. Preferably, the oxidation is conducted using oxygen-enriched air, preferably pure oxygen. The ratio $H_2S/O_2$ in the feedstock is higher than 2:1, preferably in the range of 3:1-5:1.

11 Claims, 2 Drawing Sheets

(51) Int. Cl.
*C01B 3/04* (2006.01)
*C01B 3/06* (2006.01)
*B01D 53/86* (2006.01)
*B01J 19/24* (2006.01)

(52) U.S. Cl.
CPC .............. *B01J 19/245* (2013.01); *C01B 3/02* (2013.01); *C01B 3/04* (2013.01); *C01B 17/0413* (2013.01); *C01B 17/0495* (2013.01); *B01D 2251/102* (2013.01); *B01D 2256/16* (2013.01); *B01J 2219/0015* (2013.01); *B01J 2219/00157* (2013.01); *B01J 2219/24* (2013.01); *C01B 2203/0255* (2013.01); *C01B 2203/06* (2013.01); *Y02E 60/364* (2013.01); *Y02P 20/129* (2015.11)

(58) Field of Classification Search
CPC ......... C01B 2203/0255; C01B 2203/06; Y02E 60/364; B01J 19/245; B01J 19/24; B01J 2219/0015; B01J 2219/00157; B01J 2219/24; B01D 53/8612; B01D 2256/16; B01D 2251/102; Y02P 20/129
See application file for complete search history.

(56) References Cited

U.S. PATENT DOCUMENTS

| | | | | |
|---|---|---|---|---|
| 4,481,181 A | * | 11/1984 | Norman | C01B 3/02 423/571 |
| 5,672,326 A | * | 9/1997 | Minak | B01D 53/8634 423/224 |
| 6,403,051 B1 | * | 6/2002 | Keller | C01B 3/386 423/245.1 |
| 7,707,837 B2 | * | 5/2010 | Inui | F02C 3/22 60/39.182 |
| 2003/0031607 A1 | | 2/2003 | Streicher | |
| 2006/0051275 A1 | * | 3/2006 | Ramani | B01D 53/8612 423/576.2 |
| 2011/0206601 A1 | * | 8/2011 | Li | C01B 17/0404 423/567.1 |

FOREIGN PATENT DOCUMENTS

WO WO-2005/049487 6/2005
WO WO-2010/141496 12/2010

OTHER PUBLICATIONS

Database WPI, Accession No. 1989-360727 (1989).
International Search Report for PCT/NL2012/050310, dated Jun. 28, 2012, 3 pages.

* cited by examiner

ZERO EMISSIONS SULPHUR RECOVERY PROCESS WITH CONCURRENT HYDROGEN PRODUCTION

CROSS-REFERENCE TO RELATED APPLICATIONS

This application is a continuation of U.S. application Ser. No. 14/115,812 having an international filing date of 7 May 2012, now allowed, which is the national phase of PCT application PCT/NL2012/050310 having an international filing date of 7 May 2012, which claims benefit of European application No. 11165177.4, filed 6 May 2011. The contents of the above patent applications are incorporated by reference herein in their entirety.

FIELD OF THE INVENTION

The invention pertains to a process for recovering sulphur from a $H_2S$-containing gas stream, and to a sulphur recovery plant. Particularly, the invention pertains to the production of hydrogen associated with a sulphur recovery process.

BACKGROUND OF THE INVENTION

Sulphur Recovery Plants are designed to remove $H_2S$ from $H_2S$-containing acid gases from Amine Regeneration Systems and from Sour Water Strippers producing sulphur, a non toxic product which can be stored and sold in liquid or in solid form to different users for several different industrial applications. The acid gases from Amine Regeneration Systems and Sour Water Strippers, containing a variable amount of $H_2S$, are treated in a Sulphur Recovery Unit (SRU), generally based on the modified Claus process, for bulk sulphur recovery and subsequently in a Tail Gas Treatment (TGT) section for deep sulphur recovery. Other impurities contained in the sour gases, including ammonia and hydrocarbons, are destroyed in the Claus section.

The modified Claus process by itself recovers about 94÷96% (2 catalytic stages) or 95÷98% (3 stages) of the sulphur in the feedstock. A further treatment of the Claus tail gas is therefore necessary when a higher Sulphur Recovery Efficiency (SRE) is required.

The modified Claus process comprises a sub-stoichiometric combustion of the acid gas stream in a thermal reactor (thermal stage) followed by catalytic conversion in the Claus reactors (catalytic stage). In the Claus section one-third of the total $H_2S$ is oxidized to $SO_2$, which reacts with the remaining $H_2S$ to form sulphur and water according to the following reactions:

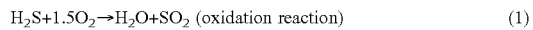  $H_2S+1.5O_2 \rightarrow H_2O+SO_2$ (oxidation reaction)  (1)

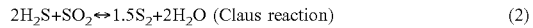  $2H_2S+SO_2 \leftrightarrow 1.5S_2+2H_2O$ (Claus reaction)  (2)

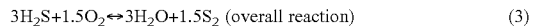  $3H_2S+1.5O_2 \leftrightarrow 3H_2O+1.5S_2$ (overall reaction)  (3)

The goal of the process is to drive the overall reaction to near completion. In the Claus thermal reactor, the $H_2S$ contained in the acid gas is burnt with air (or with oxygen-enriched air in some specific cases) in a specific burner and only one-third of the total $H_2S$ is oxidized to $SO_2$, while the remaining two-third is not reacted. The total air amount is the one exactly sufficient to oxidize one-third of the total $H_2S$ and to completely oxidize all hydrocarbons and ammonia contained in the feedstock; the molar ratio $H_2S/O_2$ in the feedstock is therefore about 2:1 in order to get a ratio $H_2S/SO_2$ in the Claus tail gas of exactly, or as close as possible to, 2:1, which is the stoichiometric ratio for the Claus reaction, so maximizing Sulphur Recovery Efficiency. During acid gas combustion, a small part of the $H_2S$ (typically 5÷7%) is dissociated to hydrogen and sulphur as per following reaction:

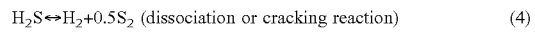  $H_2S \leftrightarrow H_2+0.5S_2$ (dissociation or cracking reaction)  (4)

According to Clark et al., Alberta Sulphur Research Ltd. (ASRL), hydrogen formation also happens according to the following reaction:

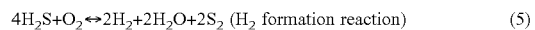  $4H_2S+O_2 \leftrightarrow 2H_2+2H_2O+2S_2$ ($H_2$ formation reaction)  (5)

Several side reactions are also involved, leading to the destruction of ammonia and hydrocarbons and to the formation of carbonyl sulphide COS and carbon disulphide $CS_2$. In order to complete the Claus reactions, a suitable residence time is necessary at high temperature in the thermal reactor.

The Claus thermal reactor is typically followed by a waste heat boiler where furnace effluent is cooled down to about 300° C. and heat is recovered by raising high pressure steam and by a sulphur condenser where process gas is cooled down to sulphur dew point by raising low pressure steam and liquid sulphur is separated.

The Claus thermal stage is generally followed by two or three catalytic stages, each one composed by a gas reheater to bring the gas to the optimal reaction temperature, a catalytic reactor where the Claus reaction takes place and a sulphur condenser where gas is cooled and liquid sulphur is condensed and separated. The Claus reaction is an exothermic equilibrium reaction thermodynamically enhanced by low temperatures. The first Claus catalytic reactor is partly filled with a Claus catalyst (Alumina based) to enhance the Claus reaction and partly filled with a specific high conversion catalyst (Titania based) to enhance the hydrolysis of COS and $CS_2$. The second and third Claus catalytic reactors, if any, are generally filled with Claus catalyst (Alumina based) to enhance Claus reaction.

In order to satisfy the >99% sulphur recovery efficiency normally required for a Sulphur Recovery Plant, the Claus section is generally followed by a Tail Gas Treatment section. Several different alternative processes have been proposed over the years to boost Sulphur Recovery Efficiency, like the SCOT method by Shell Oil Company, the RAR process by TKT, the CBA process by AMOCO, the CLINSULF/DEGSULF method by Linde Actiengesellschaft or the BSR Selectox process by UOP. In the traditional reductive Tail Gas Treatment section, the process gas from a Claus section is preheated and combined with hydrogen from an external source prior to being fed to a hydrogenation reactor, where all sulphur compounds are converted to $H_2S$ over a specific reduction catalyst (Co and Mo oxides based), which performs both the hydrogenation and the hydrolysis functions. The reactor effluent is cooled down in the quench tower by means of circulating steam condensate. The $H_2S$ produced in the hydrogenation reactor is recovered in an amine absorber with a specific amine aqueous solution and recycled to the Claus section from the top of an amine regenerator, where the enriched solution is stripped.

The tail gas from the amine absorber is sent to a thermal incinerator for the oxidation of residual $H_2S$ and other sulphur compounds, such as COS and $CS_2$, to $SO_2$ prior to disposal to the atmosphere via a dedicated stack.

The main drawbacks of traditional Claus Plant are the need for large and expensive equipment against very low sulphur economic value, continuous emissions of $SO_x$ ($SO_2$ and $SO_3$), CO, $CO_2$, $NO_x$ plus traces of $H_2S$ into the atmosphere, and continuous import of hydrogen from the network, for process gas reduction in the TGT section.

In some Plants, where hydrogen is not available, for example in gas fields, the reducing gas mixture is generated in a reducing gas generator by sub-stoichiometric fuel gas combustion. The main drawback of such alternative configuration is the 10÷15% higher process gas flow rate and subsequent larger equipment size due to substantial quantities of inerts coming from in-line fuel gas combustion (mainly nitrogen from air and water and carbon dioxide from combustion).

Some alternative processes have been proposed over the years, which are addressed to thermal or catalytic partial oxidation of $H_2S$.

U.S. Pat. No. 4,481,181 by GA Technologies Inc. discloses a process for removing sulphur and recovering hydrogen from a $H_2S$-containing gas stream coupling thermal partial oxidation of $H_2S$ to sulphur and water and thermal dissociation of $H_2S$ to hydrogen and sulphur in the same reaction zone, preceded by feedstock heating section and followed by a cooling zone and by a sulphur condenser, using pure oxygen and a substantial proportion of nitrogen with a $H_2S/O_2$ ratio in the feedstock between 10:1 and 25:1. The main goal of this patent is to thermally decompose by partial oxidation and dissociation hydrogen sulphide into sulphur and hydrogen.

WO2010/036941 by Chevron U.S.A. Inc. and Drexel University discloses a method for performing $H_2S$ thermal dissociation at temperature below 1600° C. based on H and SH radicals, in one embodiment over a suitable plasma catalyst.

Furthermore, Italian Patent 1 203 898 by Siirtec-Nigi discloses a process called HCR based on the operation of the traditional Claus thermal reactor at a slightly higher $H_2S/O_2$ ratio in the feedstock in order to keep a $H_2S/SO_2$ ratio in the Claus tail gas significantly higher than 2:1. The main goal of this process is to boost hydrogen production in thermal reactor and to avoid hydrogen import in the TGT section. Also with such a process, Sulphur Recovery Plant emissions are not avoided.

From the above discussion, it is evident that several efforts have been made in the past, trying to propose a valid alternative to traditional Claus Plant. In particular, some processes which have been proposed over the years are based on the thermal or catalytic partial oxidation of $H_2S$, while some other processes are focused on the thermal or catalytic cracking of $H_2S$. None of the proposed processes is conceived and arranged to perform $H_2S$ conversion to hydrogen and sulphur aiming at favoring both reactions at the same time.

It would be desired to reduce, and preferably avoid, emissions into the atmosphere. It would also be desired to reduce, and preferably avoid, the importation of hydrogen into the process. Particularly, it would be desired to generate hydrogen, and to optimize the export of hydrogen from the process, yet with concurrent production of sulphur.

SUMMARY OF THE INVENTION

In order to better address one or more of the foregoing desires, the invention presents, in one aspect, a method for the production of hydrogen from a $H_2S$-containing gas stream, comprising subjecting the gas stream to thermal oxidative cracking so as to form $H_2$ and $S_2$.

In another aspect, the invention provides a plant suitable for conducting the thermal oxidative cracking of a $H_2S$-containing gas stream, said plant comprising an inlet for a $H_2S$-containing acid gas stream, an inlet for an oxygen-comprising stream, and a thermal oxidative cracking reaction zone comprising a mixing zone, preferably comprising a burner, and a thermal reactor.

In another aspect, the invention relates to a method for the combined production of hydrogen and sulphur from a $H_2S$-containing gas stream, comprising subjecting the gas stream to the aforementioned process.

DETAILED DESCRIPTION OF THE INVENTION

Figure 1:
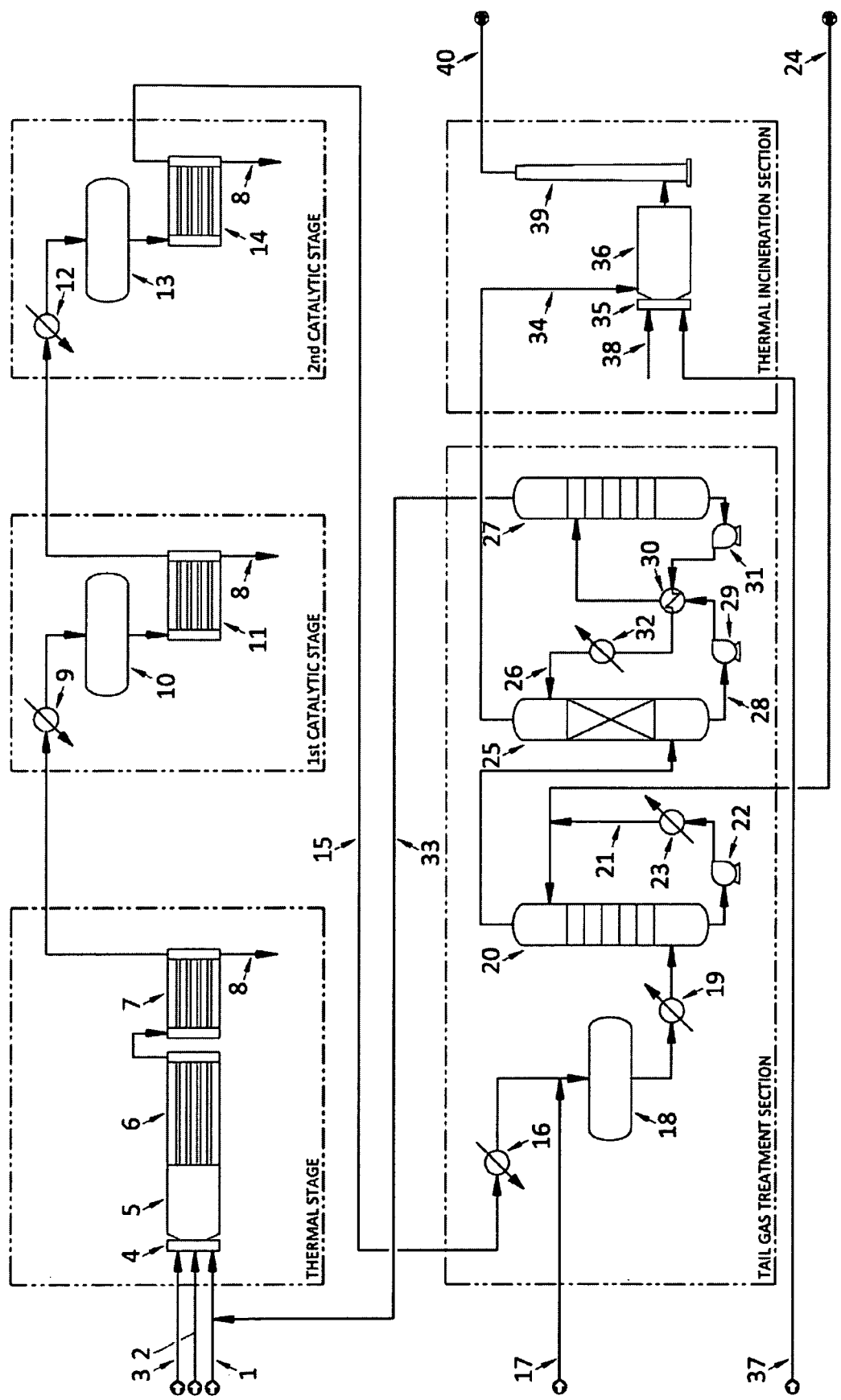
FIG. 1 depicts a simplified flow scheme of a typical traditional Claus Plant comprising a thermal stage, two catalytic stages, a subsequent reductive Tail Gas Treatment section, and a thermal incineration section.

In a broad sense, the invention is based on the simultaneous occurrence of cracking and partial oxidation of $H_2S$ so as to provide concurrent production of sulphur and of a significant amount of hydrogen. This serves to address the problem of gas emissions into the atmosphere and producing at the same time a valuable hydrogen export stream.

It is emphasized that the thermal oxidative cracking in accordance with the invention is a fundamentally different process from both the thermal stage and the catalytic stage in an existing Claus-type process. With reference to the reaction equations (1) to (5) mentioned above, the Claus processes are directed to driving the above reaction (3) to near completion. The present invention is based on the judicious insight to provide a process based on the side reactions (4) and (5), and to promote these reactions for the production, from a $H_2S$-containing gas-stream, of both hydrogen and sulphur.

In the present invention, a Thermal Oxidative Cracking (TOC) stage substitutes the Claus thermal stage. The process of the invention thus favors $H_2S$ dissociation and partial oxidation instead of complete oxidation and Claus reaction.

The thermal oxidative cracking is conducted in one or more reaction zones, preferably provided in a single reaction chamber. A single reaction zone, in a single reaction chamber is preferred.

The invention presents the skilled person with the insight to promote the above-mentioned reactions (4) and (5). The fact that thereto the gas stream is to be subjected to thermal oxidative cracking, implies a clear message to the skilled person as to how to carry this out.

The reaction is carried out at a temperature between 1100° C. and 1550° C., under the influence of oxygen. The ratio between $H_2S$ and oxygen is above 2:1, and preferably in the range of from 3:1 to 5:1, more preferably in the range 4:1-4.5:1, and wherein the oxygen is provided in a gas stream comprising at least 40% of oxygen.

The Thermal Oxidative Cracking reaction zone is provided with oxygen. The oxygen is preferably provided as a gas enriched with oxygen as compared to air. Preferably, this is an oxygen-containing gas-stream comprising at least 40 vol. % oxygen, preferably at least 60 vol. % oxygen. More preferably, this oxygen is provided as substantially pure oxygen, viz. 90 vol. %-99 vol. % of oxygen, or as close to 100% as available.

The use of oxygen-enriched gas, and preferably pure oxygen, is not only related to optimizing the thermal oxidative cracking process, it also presents advantages such as the avoidance of unnecessarily large equipment, which would be needed on account of the presence of large volumes of inert (nitrogen) gas. Moreover, with reference to the invention's purpose to produce hydrogen, in addition to sulphur recovery and with reduced emissions, it will be advantageous to reduce, and preferably avoid, the presence of nitrogen in the tail gas of the process.

The quantity of oxygen fed to the reactor is selected so as to achieve a ratio $H_2S/O_2$ in the feedstock higher than typical figure of about 2:1. Preferably, $H_2S/O_2$ ratio in the feedstock should be in the range 3:1 to 5:1, more preferably in the range 4:1-4.5:1, for example about 4.4.

In the preferred embodiment of operating the thermal oxidative cracking on the basis of a ratio $H_2S/O_2$ between 4:1 and 4.5:1, preferred reaction temperatures to obtain simultaneously cracking and partial oxidation of $H_2S$ are in the range of from 1100 to 1400° C., preferably about 1200° C.

In one embodiment, the feedstock to the Thermal Oxidative Cracking reaction zone ($H_2S$-containing acid gas and oxygen-containing gas) is preheated in order to increase the reaction temperature, to boost hydrogen production and to depress $SO_2$ formation. In a preferred embodiment, such preheating is performed with high pressure steam at about 45 barg from a waste heat boiler in order to achieve a feedstock inlet temperature of about 240° C.

It should be noted that the reaction preferably is conducted autothermally. This refers to the fact that, whilst the process is preferably adiabatic, heat exchange takes in fact place, since the oxidation reaction is exothermal, and the cracking reaction is endothermal, whereby heat made available through the exothermal reaction is utilized in the endothermal reaction.

All in all, the process of the invention is believed to favor reactions (4) and (5) relative to reactions (1) and (2), leading to lower $H_2S$ conversion, but on the other hand to significantly higher $H_2$ formation and to much lower $SO_2$ formation. As a consequence of the lower $H_2S$ conversion, a higher acid gas recycle rate from $H_2S$-containing gas source (e.g., an amine regenerator) to reaction chamber is obtained as compared to a traditional Claus Plant.

The thermal oxidative cracking process of the invention is conducted at an optimum temperature so as to provide the minimum approach to maximum possible equilibrium figures.

This results in increasing the hydrogen yield and minimizing $SO_2$ formation, which in turn serves to minimize hydrogen consumption in the Tail Gas Treatment section to reduce $SO_2$ to $H_2S$.

Preferably, the $H_2S$-containing acid gas and the oxygen-containing gas are mixed in a mixing zone prior to entering the thermal oxidative cracking zone. In one embodiment the mixing zone comprises a burner mounted in front of the reaction chamber.

The gas effluent from the reaction chamber is preferably quenched so as to avoid recombination of $H_2$ and $S_2$ to form $H_2S$, viz. by the inverse reaction of (4), which would make the process sub-optimal in terms of overall conversion. Preferably this quenching is done substantially instantaneously. The quenching is preferably to a temperature lower than 950° C., more preferably in the range 850÷750° C. The residence time in the quench zone is preferably as short as possible, typically of from 10 ms to 300 ms, preferably from 10 ms to 100 ms, more preferably from 10 ms to 50 ms.

The quench zone (which preferably is a zone of the reaction chamber) is preferably followed by a waste heat boiler and a sulphur condenser to cool down the process gas and to recover liquid sulphur. The latter is preferably done by raising high pressure steam in the waste heat boiler and low pressure steam in the sulphur condenser.

In a preferred embodiment, the quenching of the gas effluent from the reaction chamber is achieved by mixing with water in the final part of the reaction chamber. The mixing may be done by direct injection of water into the reaction chamber through a spray nozzle.

Although the process of the invention substantially reduces the formation of $SO_2$, it will be inevitable that some $SO_2$ is formed. In order to remove such $SO_2$, the Thermal Oxidative Cracking stage is preferably followed by a Tail Gas Treatment section. Therein a part (e.g. about 10-15 vol. %) of the produced hydrogen is consumed in order to reduce residual $SO_2$ to $H_2S$ in a hydrogenation reactor. Due to the much higher hydrogen content and to the much lower $SO_2$ content in the tail gas compared to traditional Claus Plant, the reduction step of the Tail Gas Treatment section can be performed without any hydrogen import.

The tail gas is preferably preheated and fed to a hydrogenation reactor. Therein the $SO_2$, as well as other residual sulphur compounds, such as COS and $CS_2$, are converted into $H_2S$, which is then removed. This removal can be done in a conventional manner, e.g., by scrubbing the gas with a lean amine solution in an absorber.

In one embodiment, the Thermal Oxidative Cracking stage is followed by one Claus catalytic stage, comprising a gas reheater, a Claus catalytic reactor and sulphur condenser, in order to convert most of the $SO_2$ into sulphur, thereby minimizing $H_2$ consumption for $SO_2$ reduction in the Tail Gas Treatment section.

In one embodiment, the hydrogen stream obtained from the TGT absorber is sent to end users, like hydrotreaters, hydrocrackers or hydrodesulphurizers. It should be noted that the composition of hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

In a preferred embodiment, a hydrogen stream obtained from the TGT absorber is further purified in a Hydrogen Purification section (for example a Pressure Swing Absorber). It should be noted that, prior to purification, the composition of a hydrogen rich stream from the top of the TGT absorber may be different depending on variables such as SRU feedstock quality, plant configuration and operating conditions, and may include traces or percentages of $H_2O$, $N_2$, CO, $CO_2$, $H_2S$, COS and $CS_2$.

The purified hydrogen is sent to end users, like hydrotreaters, hydrocrackers or hydrodesulphurizers.

The invention, in one aspect, also relates to a plant suitable for conducting the thermal oxidative cracking of a $H_2S$-containing gas stream, said plant comprising an inlet for a $H_2S$-containing acid gas stream, an inlet for an oxygen-comprising stream, and a Thermal Oxidative Cracking reaction zone. Preferably, the plant further comprises a gas quench zone.

In one embodiment, the Thermal Oxidative Cracking reaction chamber is refractory lined in order to withstand temperatures up to 1550° C.

The invention will be illustrated with reference to the following, non-limiting Figures and Examples.

DETAILED DESCRIPTION OF THE FIGURES

Looking at FIG. 1, in a traditional Claus Plant, acid gas from one or more Amine Regeneration Unit(s) 1 is fed together with acid gas from Sour Water Stripper Unit(s) 2 and with a combustion air stream 3 to a thermal reactor burner (or Claus main burner) 4, directly connected to a thermal reactor (or reaction furnace) 5, where one third of $H_2S$ is converted to $SO_2$ and all other compounds such as hydrocarbons and ammonia are completely oxidized. The furnace effluent, after an adequate residence time in the thermal reactor, is cooled down in a Claus waste heat boiler 6, where heat is recovered generating high pressure steam. The process gas from the Claus waste heat boiler is fed to a first sulphur condenser 7, where gas is cooled generating low pressure steam and sulphur 8 is condensed and is sent to degassing and storage. The process gas from the first sulphur condenser is preheated in a first Claus reheater 9 before entering a first Claus catalytic reactor 10, where the reaction between $H_2S$ and $SO_2$ to produce sulphur vapors continues until equilibrium. The process gas from reactor 10 is sent to a second sulphur condenser 11, where gas is cooled generating low pressure steam and sulphur 8 formed in the reactor is condensed and is sent to degassing and storage. The process gas from the second sulphur condenser is preheated in a second Claus reheater 12 before entering a second Claus catalytic reactor 13, where the reaction between the $H_2S$ and $SO_2$ to sulphur vapours continues until equilibrium. The process gas from reactor 13 is fed to a third sulphur condenser 14, where gas is cooled generating low pressure steam (generally 4.5-6 barg), or low pressure steam (generally about 1.2 barg) and sulphur 8 formed in the reactor is condensed and is sent to degassing and storage. Claus tail gas 15 from third sulphur condenser is sent to Tail Gas Treatment section.

Figure 2:
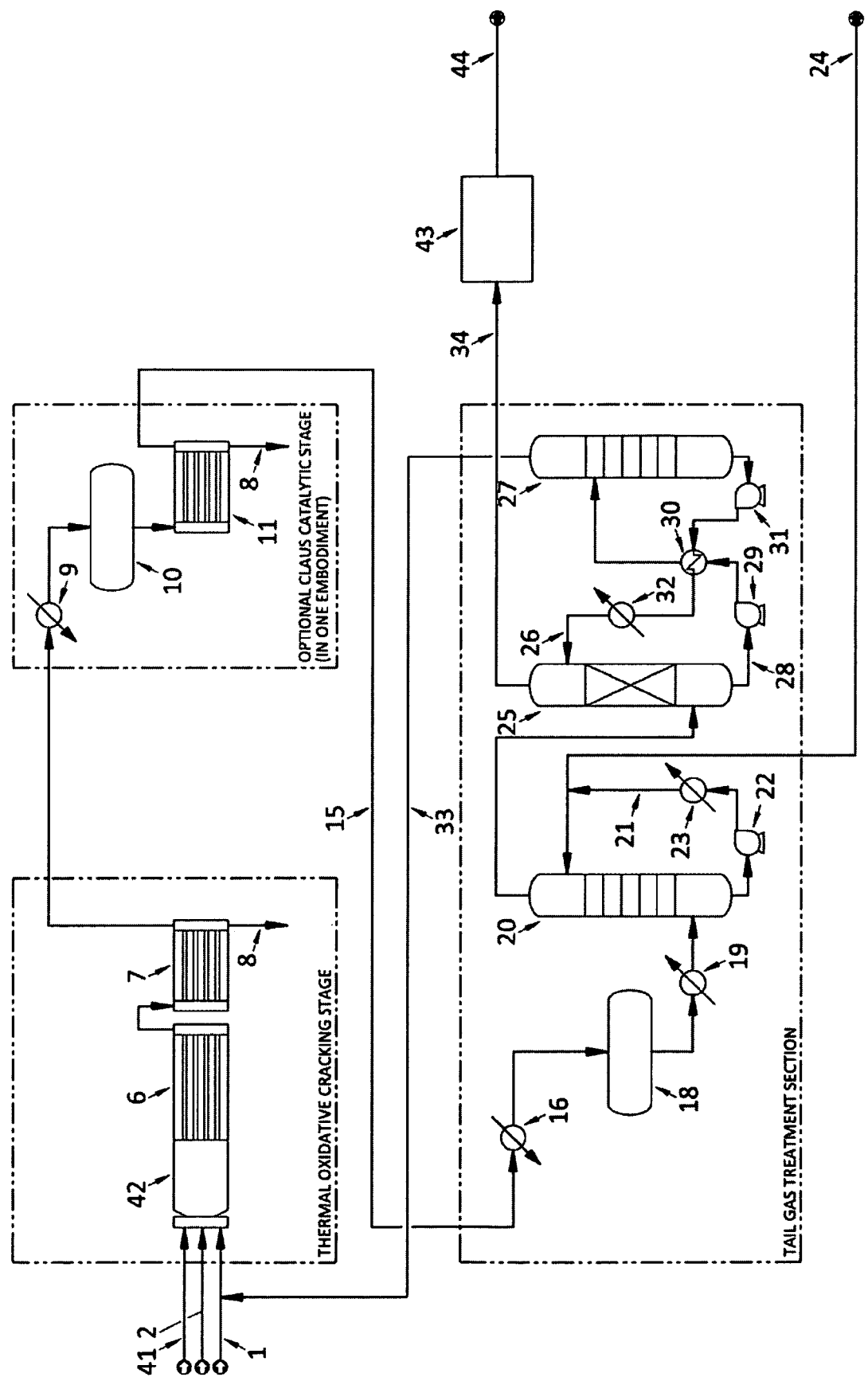
FIG. 2 presents a simplified flow scheme of an $H_2S$ Thermal Oxidative Cracking Plant according to the invention, comprising a thermal oxidative cracking stage, optionally a Claus catalytic stage, and a subsequent reductive Tail Gas Treatment section.

Looking at FIG. 2, in a $H_2S$ Thermal Oxidative Cracking Plant according to the invention, acid gas from one or more Amine Regeneration Unit(s) 1 is fed together with acid gas from one or more Sour Water Stripper Unit(s) 2 and with a pure oxygen stream 41 (or an oxygen-enriched air stream) to a Thermal Oxidative Cracking reaction chamber 42, where $H_2S$ is partially oxidized to $S_2$ and partially dissociated into $H_2$ and $S_2$, while all other compounds such as hydrocarbons and ammonia are completely oxidized and only a very small amount of $SO_2$ is formed. The reactor effluent is cooled down in a waste heat boiler 6, where heat is recovered generating high pressure steam. The process gas from the waste heat boiler is fed to a sulphur condenser 7, where gas is cooled generating low pressure steam and sulphur 8 is condensed and is sent to degassing and storage; tail gas 15 from sulphur condenser is sent to a Tail Gas Treatment section.

In one embodiment, the process gas from the waste heat boiler 6 is fed to a first sulphur condenser 7, where gas is cooled generating low pressure steam and sulphur 8 is condensed and is sent to degassing and storage. The process gas from the first sulphur condenser is preheated in the first Claus reheater 9 before entering a first Claus catalytic reactor 10, where the reaction between $H_2S$ and $SO_2$ to produce sulphur vapors continues until equilibrium, so removing almost all $SO_2$. The process gas from reactor 10 is sent to a second sulphur condenser 11, where gas is cooled generating low pressure steam and sulphur 8 formed in the reactor is condensed and is sent to the degassing and storage.

Tail gas 15 from the second sulphur condenser (or from the first sulphur condenser in the first embodiment) is sent to a Tail Gas Treatment section.

In both Plant configurations shown in FIG. 1 and FIG. 2, and also in the embodiment of the present invention comprising a further Claus catalytic step, tail gas 15 from final sulphur condenser is first preheated in the tail gas preheater 16. In the traditional Claus Plant, as shown in FIG. 1, tail gas is mixed as necessary with hydrogen obtained from an external network 17, while in the novel $H_2S$ Thermal Oxidative Cracking Plant according to the invention, as shown in FIG. 2, separate import of hydrogen is not necessary, and tail gas is directly sent to a hydrogenation reactor 18. In the hydrogenation reactor (or reduction reactor) all sulphur compounds contained in the process gas are converted to $H_2S$ under slight hydrogen excess. The tail gas leaving the reactor is cooled down first in a TGT waste heat boiler 19 generating low pressure steam and then in a quench tower 20, where the process gas cooling is achieved by circulation of the condensate 21 generated in the gas cooling. Quench water pumps 22 provide water circulation to the tower, while heat is removed from the system by a quench water cooler 23. The excess sour water 24 generated in the gas cooling is sent to battery limits for treatment in the Sour Water Stripper (SWS) Unit. The cooled tail gas from the quench tower is fed to the absorber 25. The absorption of the $H_2S$ contained in the tail gas is accomplished using a selective lean amine solution 26 coming from an amine regenerator 27. The rich amine solution 28 from the bottom of the absorber is pumped by means of the rich amine pumps 29 to a lean/rich amine heat exchanger 30, where the rich amine is preheated using as heating medium the hot lean amine from the bottom of the amine regenerator prior of being fed to amine regenerator 27 itself. The lean amine from the bottom of the amine regenerator is pumped by means of the lean amine pumps 31, is first cooled in the lean/rich amine heat exchanger 30 and then in the lean amine cooler 32 prior of being fed to the absorber 25. The acid gas 33 from the top of regenerator is recycled back to the Claus thermal reactor burner 4 in the traditional Claus Plant (FIG. 1), while it is recycled to Thermal Oxidative Cracking reaction chamber 42 in the novel $H_2S$ Thermal Oxidative Cracking Plant of the invention (FIG. 2).

In the traditional Claus Plant (FIG. 1), the tail gas from the absorber 34 is sent to an incinerator burner 35, directly connected to an incinerator 36, where all residual sulphur compounds are oxidized to $SO_2$. The combustion of the tail gas is supported with fuel gas combustion, therefore a fuel gas stream 37 and a combustion air stream 38 are also fed to the incinerator burner. The incinerator effluent (or flue gas) 40, after an adequate residence time in the thermal incinerator, is discharged into the atmosphere via a dedicated stack 39. In the novel $H_2S$ Thermal Oxidative Cracking Plant (FIG. 2), the hydrogen rich stream from absorber 34 is sent to users outside the Sulphur Recovery Unit.

In a preferred embodiment, the hydrogen rich stream from the absorber, containing some amount of impurities such as $N_2$, $CO_2$, $H_2S$, COS and $CS_2$, is sent to a further Hydrogen Treatment section 43, where it is further purified. A substantially pure hydrogen stream 44 from Hydrogen Treatment section is finally sent to different end-users.

Example 1

A possible plant configuration is the following. Acid gas and oxygen are fed to a reaction furnace where the oxidation reactions take place. The reaction products are partially quenched and enter a Waste Heat Boiler for the recovery of the reaction heat. After heat recovery, the process gas enters a Sulphur Condenser for the separation of the produced sulphur and for a further heat recovery.

The completion of the reactions is obtained in a catalytic block, which consists of a process gas preheater, a catalytic reactor and a final sulphur condenser.

From the final condenser the tail gas is sent to a traditional reductive Tail Gas Treatment.

The selected conditions are the following:

$H_2S/O_2$ ratio 4.4

Adiabatic temperature 1200° C.

The feedstock has been preheated to 240° C.

Considering these operating conditions, the $H_2S$ conversion is 56%, where 15.8% is converted to $H_2$ and $S_2$ according to reaction 4)

39.9% is converted to $H_2O$ and $S_2$ according to reaction 3)

0.3% is converted to $SO_2$ and $H_2O$ according to reaction 1)

while 44% of $H_2S$ remains unconverted.

$SO_2$ is a substantial hydrogen consumer in the Hydrogenation Reactor and in order to reduce it to very low concentration, a Claus catalytic reactor has been considered downstream the Waste Heat Boiler and the Sulphur Condenser.

The tail gas, coming out from the final condenser, after preheating is fed to the Hydrogenation Reactor, where the sulphur vapors are transformed to $H_2S$, COS and $CS_2$ are hydrolyzed and CO is shifted to hydrogen.

The reactions are the following:

$$S_n + nH_2 \rightarrow nH_2S$$

$$COS + H_2O \rightarrow CO_2 + H_2S$$

$$CS_2 + 2H_2O \rightarrow CO_2 + 2H_2S$$

$$CO + H_2O \rightarrow CO_2 + H_2$$

The remaining small concentration of $SO_2$ shall react as follows:

$$SO_2 + 3H_2 \rightarrow H_2S + 2H_2O$$

The tail gas coming from the Hydrogenation Reactor is cooled down in a Quench Tower where the water generated in the oxidation reactions is condensed.

Finally, the cool gas is washed in an Amine Absorber. From the top of the Amine Absorber a hydrogen rich stream, containing impurities such as H2S, $CO_2$ and $N_2$, is released.

The rich amine from the bottom of the Amine Absorber is sent to the Amine Regeneration section generating an $H_2S$ and $CO_2$ stream, which is recycled to the reaction furnace.

Therefore, the sulphur lost is only the $H_2S$ contained in the hydrogen stream leaving the Amine Absorber, so the sulphur recovery efficiency can be higher than 99.9%.

The balance shows that from a feedstock containing 100 kmol of $H_2S$, 30 kmol of hydrogen can be recovered, leading to a good saving in hydrogen consumption of the hydrotreating. It has to be noted that a traditional plant has instead a hydrogen consumption of about 1-2 kmol per 100 kmol of $H_2S$ for the Tail Gas hydrogenation step.

Other differences between a traditional plant and a plant with hydrogen recovery can be noted by the comparison of the relevant heat and material balances. For this purpose the material balance of the two plant configurations has been carried out for a capacity of 100 T/D of sulphur product. The relevant process gas flow rates in crucial parts of the plant are shown in Table 1.

TABLE 1

| Process gas flow rates | | | | |
|---|---|---|---|---|
| | Traditional Plant | | $H_2$ Recovery Plant | |
| | Kg/h | Kmol/h | Kg/h | Kmol/h |
| Reaction Furnace | 14425 | 481 | 9900 | 314 |
| Final Condenser | 10255 | 422 | 5729 | 256 |
| Quench Tower Outlet | 8087 | 304 | 3938 | 157 |
| Absorber Outlet | 7832 | 295 | 335 | 48 |

Table 1 shows that the process gas flow rates of the hydrogen recovery plant are lower compared to the one of the traditional plant. Therefore, equipment sizes will be smaller and less expensive.

The invention claimed is:

1. A plant suitable for conducting thermal oxidative cracking of a $H_2S$-containing gas stream, said plant comprising a reaction chamber which comprises a mixing zone, a burner and a thermal oxidative cracking zone downstream of said mixing zone and an inlet coupled to a source of a $H_2S$-containing acid gas stream, which source is an amine regeneration unit, a sour water stripper unit or both, and an inlet coupled to a source of an oxygen-comprising stream, both of said inlets configured to introduce said $H_2S$ containing gas and said oxygen-comprising stream into said mixing zone to obtain a mixture, wherein the mixing zone comprises said burner;

wherein said reaction chamber further contains downstream of said reaction zone a quench zone for effluent from the thermal oxidative cracking reaction zone which quench zone comprises a spray nozzle for direct injection of water; and a hydrogen purification section configured to receive hydrogen downstream of said quench zone and wherein the thermal oxidative cracking reaction zone does not contain a catalyst.

2. The plant of claim 1 which further comprises a waste heat boiler, downstream of the quench zone, for generating steam, and a preheater for preheating said $H_2S$ containing gas and said oxygen-comprising stream using said steam.

3. The plant of claim 1 which further contains a hydrogenation reactor for effluent from the thermal oxidative cracking reaction zone.

4. The plant of claim 1 which further contains a subsequent Claus catalytic section comprising a gas reheater, a Claus catalytic reactor and a sulfur condenser, downstream of the thermal oxidative cracking zone.

5. The plant of claim 1 wherein said thermal oxidative cracking reaction zone comprises a reaction chamber lined to withstand temperatures up to 1,550° C.

6. The plant of claim 1 wherein said plant further comprises a waste heat boiler positioned downstream of the reaction chamber and a sulfur condenser downstream of the waste heat boiler.

7. The plant of claim 1 wherein the $H_2S$-containing acid gas stream is derived from both an amine regeneration system and a sour water stripper unit said system and unit connected to an inlet to a thermal oxidative cracking unit, and wherein said thermal oxidative cracking unit comprises an inlet coupled to said amine regeneration unit and an inlet coupled to said sour water stripper unit.

8. The plant of claim 1 wherein the hydrogen purification section comprises a pressure swing absorber.

9. The plant of claim 7 wherein the hydrogen purification section comprises a pressure swing absorber.

10. The plant of claim 1 which further comprises a tail gas pre-heater receiving a gas stream from the quench zone, a hydrogenation reactor receiving preheated tail gas from the tail gas pre-heater, a waste heat boiler configured for cooling gas leaving the hydrogenation reactor, a quench tower configured for receiving cooled gas from the waste heat boiler, an amine absorber connected to receive quenched gas from the quench tower and configured for absorption of $H_2S$ from the quenched gas, and wherein the hydrogen purification section is configured for receiving gas from the absorber.

11. The plant of claim 7 which further comprises a tail gas pre-heater receiving a gas stream from the quench zone, a hydrogenation reactor receiving preheated tail gas from the tail gas pre-heater, a waste heat boiler configured for cooling gas leaving the hydrogenation reactor, a quench tower configured for receiving cooled gas from the waste heat boiler, an amine absorber connected to receive quenched gas from the quench tower and configured for absorption of $H_2S$ from the quenched gas, and wherein the hydrogen purification section is configured for receiving gas from the absorber.

\* \* \* \* \*